(12) United States Patent
Cheriton

(10) Patent No.: US 11,579,614 B2
(45) Date of Patent: Feb. 14, 2023

(54) INCORPORATING RULES INTO COMPLEX AUTOMATED DECISION MAKING

(71) Applicant: OptumSoft, Inc., Menlo Park, CA (US)

(72) Inventor: David R. Cheriton, Palo Alto, CA (US)

(73) Assignee: OptumSoft, Inc., Vero Beach, FL (US)

( * ) Notice: Subject to any disclaimer, the term of this patent is extended or adjusted under 35 U.S.C. 154(b) by 340 days.

(21) Appl. No.: 16/512,037

(22) Filed: Jul. 15, 2019

(65) Prior Publication Data
US 2020/0019174 A1 Jan. 16, 2020

Related U.S. Application Data

(60) Provisional application No. 62/698,672, filed on Jul. 16, 2018.

(51) Int. Cl.
*G05D 1/02* (2020.01)
*G06N 5/04* (2006.01)
*B60W 30/09* (2012.01)
*G06V 20/58* (2022.01)

(52) U.S. Cl.
CPC .......... *G05D 1/0214* (2013.01); *B60W 30/09* (2013.01); *G05D 1/0246* (2013.01); *G06N 5/04* (2013.01); *G06V 20/58* (2022.01); *G05D 2201/0213* (2013.01)

(58) Field of Classification Search
CPC .............. G05D 1/0214; G05D 1/0088; B60W 2554/00; B60W 30/09
See application file for complete search history.

(56) References Cited

U.S. PATENT DOCUMENTS

| 2002/0111755 A1* | 8/2002 | Valadarsky ........... H04L 41/065 702/58 |
| 2012/0030160 A1 | 2/2012 | Ratnam |
| 2014/0005880 A1* | 1/2014 | Guenkova-Luy ....... H04L 67/12 701/31.4 |

(Continued)

OTHER PUBLICATIONS

Mobileeye, Implementing the RSS Model on NHTSA Pre-Crash Scenarios, Feb. 18, 2018.

*Primary Examiner* — Jelani A Smith
*Assistant Examiner* — Toya Pettiegrew
(74) *Attorney, Agent, or Firm* — Van Pelt, Yi & James LLP

(57) ABSTRACT

A set of input conditions is obtained. A plurality of potential decisions is obtained based at least in part on the set of input conditions. A rule-based system is used to process the plurality of potential decisions and obtain a set of one or more updated potential decisions, wherein: the rule-based system specifies a plurality of rules; a rule specifies a rule condition and a corresponding action, wherein when the rule condition is met, the corresponding action is to be performed; and using the rule-based system to process the plurality of potential decisions includes: for a selected potential decision in the plurality of potential decisions, determining whether the rule condition is met for a selected rule among the plurality of rules, wherein the selected rule condition is dependent on, at least in part, the selected potential decision; and in response to the selected rule condition being met, performing the corresponding action. The set of one or more updated potential decisions to be executed is output.

24 Claims, 11 Drawing Sheets

(56) References Cited

U.S. PATENT DOCUMENTS

| | | | |
|---|---|---|---|
| 2014/0180995 A1* | 6/2014 | Ziegler | G06N 5/025 |
| | | | 706/47 |
| 2016/0098682 A1 | 4/2016 | Tsyganskiy | |
| 2017/0369052 A1* | 12/2017 | Nagy | B60W 30/09 |
| 2018/0154899 A1* | 6/2018 | Tiwari | G05D 1/0038 |
| 2018/0212734 A1* | 7/2018 | Zhang | H04L 5/0051 |
| 2019/0113927 A1* | 4/2019 | Englard | G05D 1/0221 |
| 2019/0289282 A1* | 9/2019 | Briggs | H04N 13/296 |

* cited by examiner 64-bit known/value block representation

INCORPORATING RULES INTO COMPLEX AUTOMATED DECISION MAKING

CROSS REFERENCE TO OTHER APPLICATIONS

This application claims priority to U.S. Provisional Patent Application No. 62/698,672 entitled INCORPORATING RULES INTO COMPLEX AUTOMATED DECISION MAKING filed Jul. 16, 2018 which is incorporated herein by reference for all purposes.

BACKGROUND OF THE INVENTION

Automated decision making occurs in a variety of applications. As a simple example, a heating system may need to decide whether to turn on the furnace or not. In this simple example, a simple rule can be specified as: "if the temperature is lower than configured, turn the furnace on, else not." The rule can be elaborated further to provide for hysteresis, so the furnace is not turned on and off rapidly right around the configured temperature. Using traditional rules to implement complex automated systems such as autonomous vehicles, however, has proven to be challenging because of the great number of variables involved in making decisions.

BRIEF DESCRIPTION OF THE DRAWINGS

Various embodiments of the invention are disclosed in the following detailed description and the accompanying drawings.

DETAILED DESCRIPTION

Figure 1:
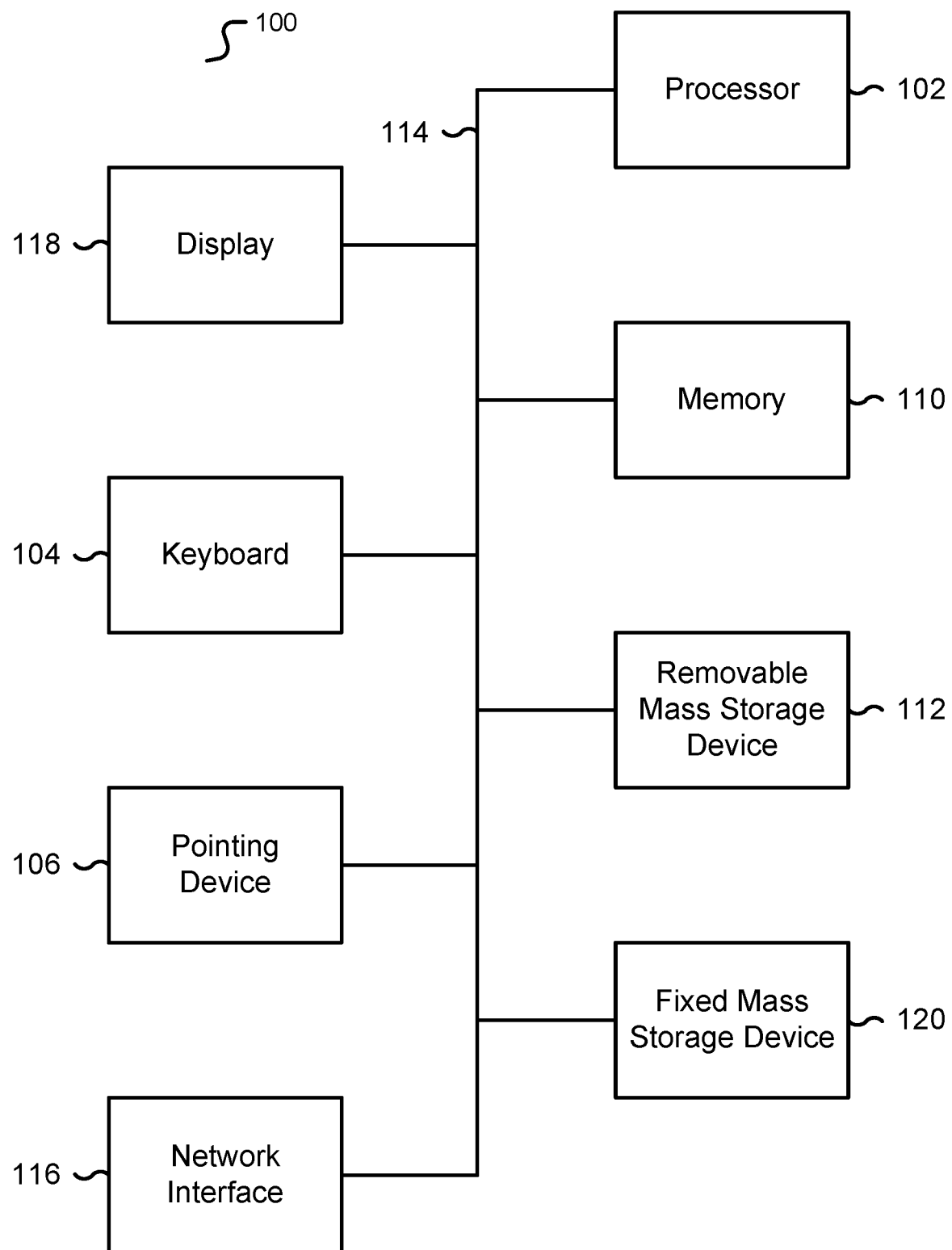
FIG. 1 is a functional diagram illustrating a programmed computer/server system for incorporating rules into complex automated decision making in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Traditional Complex Automated Decision Making.

Beyond the thermostat example given above, some applications have complex decision making requirements. For example, in an autonomous vehicle (AV), the route that the vehicle follows may be decided automatically once the desired destination is specified. However, this decision is in fact composed of a large number of component decisions such as when to change lanes, when to stop, etc. taking into account other vehicles and obstacles on the route. Moreover, the various obstacles along the route may appear and depart dynamically as well as change their own trajectories, requiring the actual path being followed to be adjusted. This means that various decisions and/or sub-decisions may have to be evaluated and/or re-evaluated multiple times. Moreover, these decisions may be made about future scenarios arising from the dynamics of the AV as well as the surrounding environment, including other vehicles, pedestrians, and other obstacles. For example, the AV may detect a potential collision well in advance in order to take corrective action and/or maintain a "safe situation" in the terminology of the Responsibility-Sensitive Safety (RSS) framework developed by Mobileye/Intel.

As another example in this domain, an AV may recognize different types of objects that occur in the environment to determine how to react to them as part of this decision making. For instance, a front-facing camera may detect a large dark object directly in front of the vehicle on the freeway on which it is travelling. If this dark object is the shadow of an overpass, no change in AV trajectory is required. However, if this dark object is a stalled vehicle, the AV should initiate immediate emergency braking and/or an evasive maneuver.

Currently, there is a lack of algorithmic process for deciding the identity of objects from images. For instance, there is no clear set of rules to determine from an image whether it is a shadow or whether it is a stalled vehicle, or something else. Therefore, a currently popular approach is to use of so-called "machine learning" techniques, training the system on a large collection of training data to recognize objects from images based on essentially statistical inference. In this approach, the identification of an object is basically a probabilistic decision based on parameters tuned from the training set data.

That said, there are rules that still apply when the object is a shadow, and other rules that apply when it is a stalled vehicle. For example, a range finder sensor may not determine the range to a shadow, whereas it may get a reading from a stalled vehicle. Similarly, a stalled vehicle has some minimal height whereas a shadow has zero height. Thus, it is possible for rules to reject certain interpretations of an image from a machine-learning-based image processing module even though the rules may not identify objects from an image in the first place. In the above example, the height rule may reject an interpretation of an image as being a shadow on the highway if other sensors determine the height to be non-zero. Rules may thus improve decisions based purely on heuristics and/or statistical inference.

FIG. 1 is a functional diagram illustrating a programmed computer/server system for incorporating rules into complex automated decision making in accordance with some embodiments. As shown, FIG. 1 provides a functional diagram of a general purpose computer system programmed to provide incorporating rules into complex automated decision making in accordance with some embodiments. As will be apparent, other computer system architectures and configurations may be used for incorporating rules into complex automated decision making.

Computer system 100, which includes various subsystems as described below, includes at least one microprocessor subsystem, also referred to as a processor or a central processing unit ("CPU") (102). For example, processor (102) can be implemented by a single-chip processor or by multiple cores and/or processors. In some embodiments, processor (102) is a general purpose digital processor that controls the operation of the computer system 100. Using instructions retrieved from memory (110), the processor (102) controls the reception and manipulation of input data, and the output and display of data on output devices, for example display and graphics processing unit (GPU) (118).

Processor (102) is coupled bi-directionally with memory (110), which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor (102). Also as well known in the art, primary storage typically includes basic operating instructions, program code, data, and objects used by the processor (102) to perform its functions, for example programmed instructions. For example, primary storage devices (110) can include any suitable computer-readable storage media, described below, depending on whether, for example, data access needs to be bi-directional or uni-directional. For example, processor (102) can also directly and very rapidly retrieve and store frequently needed data in a cache memory, not shown. The processor (102) may also include a coprocessor (not shown) as a supplemental processing component to aid the processor and/or memory (110).

A removable mass storage device (112) provides additional data storage capacity for the computer system 100, and is coupled either bi-directionally (read/write) or uni-directionally (read only) to processor (102). For example, storage (112) can also include computer-readable media such as flash memory, portable mass storage devices, holographic storage devices, magnetic devices, magneto-optical devices, optical devices, and other storage devices. A fixed mass storage (120) can also, for example, provide additional data storage capacity. One example of mass storage (120) is an eMMC or microSD device. In one embodiment, mass storage (120) is a solid-state drive connected by a bus (114). Mass storage (112), (120) generally store additional programming instructions, data, and the like that typically are not in active use by the processor (102). It will be appreciated that the information retained within mass storage (112), (120) can be incorporated, if needed, in standard fashion as part of primary storage (110), for example RAM, as virtual memory.

In addition to providing processor (102) access to storage subsystems, bus (114) can be used to provide access to other subsystems and devices as well. As shown, these can include a display monitor (118), a communication interface (116), a touch (or physical) keyboard (104), and one or more auxiliary input/output devices (106) including an audio interface, a sound card, microphone, audio port, audio recording device, audio card, speakers, a touch (or pointing) device, and/or other subsystems as needed. Besides a touch screen and/or capacitive touch interface, the auxiliary device (106) can be a mouse, stylus, track ball, or tablet, and is useful for interacting with a graphical user interface.

The communication interface (116) allows processor (102) to be coupled to another computer, computer network, or telecommunications network using a network connection as shown. For example, through the communication interface (116), the processor (102) can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor (102) can be used to connect the computer system 100 to an external network and transfer data according to standard protocols. For example, various process embodiments disclosed herein can be executed on processor (102), or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, TCP/IP, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor (102) through communication interface (116).

An auxiliary I/O device interface, not shown, can be used in conjunction with computer system 100. The auxiliary I/O device interface can include general and customized interfaces that allow the processor (102) to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus (114) is illustrative of any interconnection scheme serving to link the subsystems. Other computer architectures having different configurations of subsystems may also be utilized.

Figure 2:
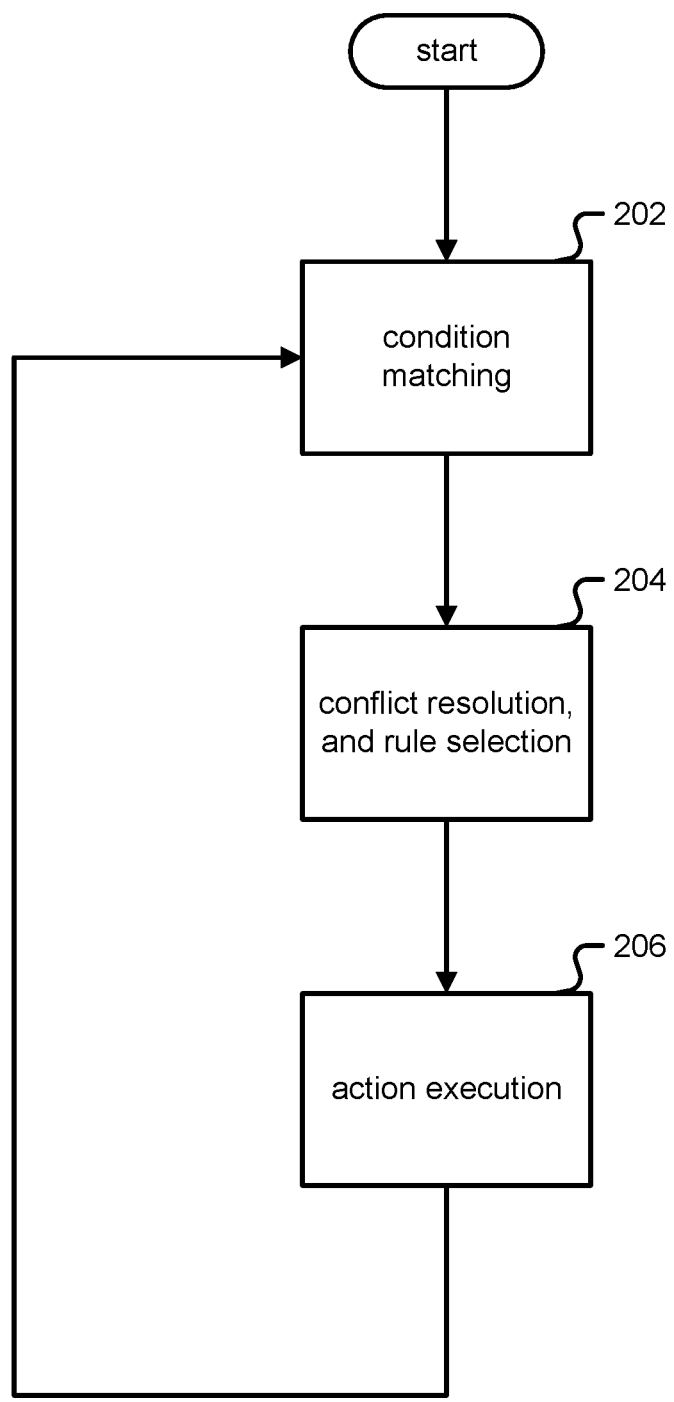
FIG. 2 is a flow chart illustrating an embodiment of a process for traditional complex automated decision making using a rule-based system.

FIG. 2 is a flow chart illustrating an embodiment of a process for traditional complex automated decision making using a rule-based system (RBS). In one embodiment, the flowchart of FIG. 2 is carried out by a system as shown in FIG. 1. In one embodiment, the flowchart of FIG. 2 is a traditional RBS execution flow. Rule-based systems have been used in the past for complex automated decision making, for example in artificial intelligence applications. These systems typically structure the rules as "condition: action", where the condition (202) indicates the condition that must be true for this rule to be applied and the action (206) is the processing to take place when the rule is to be applied.

As an example of a traditional RBS, consider a system with four components: a rule base as a type of knowledge base, including a list of rules; a temporary working memory, a user interface, and an inference engine to take action based on an interaction of input and the rule base. In the traditional RBS, this inference engine includes a traditional match-resolve-act cycle to match input to rules, perform conflict-resolution between matched rules, and act on the resolved rules.

For example, in navigation, a rule may be specified as: Condition "if vehicle is approaching a red light" (202) then Action "stop and wait for the light to turn green" (206). However, in complex applications such as autonomous driving, the rules may end up being far more complex. For instance, it is important to recognize that the vehicle should stop behind any vehicles in front of it, and not proceed on green until the other vehicles have also given it sufficient separation such that it is safe to proceed. Moreover, even if the vehicle is the first car at the intersection, it should not proceed on a green light if the intersection is still blocked by other cars.

In general, as described above traditional rule-based systems may quickly become extremely complex to develop, understand, and maintain, and expensive to execute. In particular, if multiple conditions become true, there is a need for the conflict-resolution strategy (204) that decides which action to perform first. Moreover, once a selected rule has its associated action executed (206), it is possible that one or more of the previous rules whose conditions matched actually no longer match because of the action by the first rule. It is also possible that the conditions associated with other rules now match, for the same reason. Consequently, an RBS needs to re-match on conditions (202) after each rule execution (206). With a complex set of rules and conditions, the conflict resolution (204) and re-matching (202 thru 206) may need to be repeated many times, thus significantly increasing the processing, memory, network and/or resource cost per rule execution. Moreover, these traditional RBS may be "brittle" in the sense that the rules may be too rigid or inadequate in unfamiliar situations.

That said, complex applications based purely on heuristic and statistics, for example machine learning applications, may make poor decisions in some cases, as demonstrated by several AV/self-driving vehicle accidents in which the system made poor decisions under somewhat confusing circumstances. For instance, in one case, the vehicle sped up just before hitting a guardrail, violating a basic rule of driving, namely: slow down if you are confused about the situation. Similarly, machine learning-based image recognition has been confused and produced patently false interpretations in some cases when an image is not completely within the training set that it has been trained on.

Generate-Filter-Select Complex Automated Decision Making.

Incorporating rules that ensure safe and/or constrained behavior and sensible decisions with automated complex decision making while avoiding the known difficulties with previous rule-based approaches and providing for efficient decision making is disclosed. In some embodiments, a decision making process that includes a generation phase, a filtering phase and a selection phase is disclosed.

Figure 3:
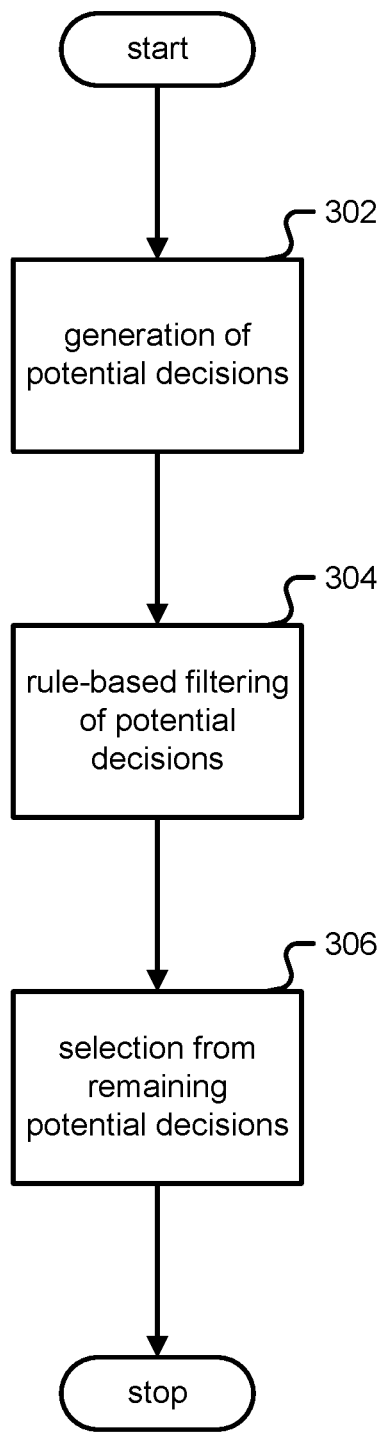
FIG. 3 is a flow chart illustrating an embodiment of a process for a generate-filter-select decision process.

FIG. 3 is a flow chart illustrating an embodiment of a process for a generate-filter-select decision process. In FIG. 3, there is a generation phase (302) in which a set of potential decisions, the potential decision set (PDS), is generated for a given scenario. In the filtering phase (304), the entries in PDS are tested against rules which may result in an entry being deleted, reprioritized and/or re-evaluated/modified. In one embodiment, the process of FIG. 2 is used in (304) but in a filter phase without the need for conflict-resolution in (204). In the selection phase (306), a remaining entry in the PDS is selected by some criteria, typically some cost function. This three-phase sequence is referred to herein as the generate-filter-select decision process, or "GFSDP".

For example, with an autonomous vehicle, in the generation phase (302), a set of possible navigational plans is generated from the current location to the desired destination. In one embodiment, a navigation plan can include directions/paths for the vehicle to take, instructions for the vehicle's steering, accelerator, brakes, and the like. This set may be generated by various traditional techniques. As one choice, standard path-finding automatic navigation techniques as used in current car navigator products may be used to generate multiple paths, for example a sequence of waypoints, from the current location to the desired destination. In another domain, such as deciding on the potential interpretations of an image, a machine learning approach may be used to generate the set, ordered by probability/confidence. In another case, random generation may be used to explore outlier possibilities. A mixture of these approaches may be used simultaneously.

The set of possible navigation plans includes one or more entries. In the filtering phase (304), an RBS is used to identify problems with zero or more entries in this set. In particular, any entry that triggers one or more rules specified in this rule-based system is deemed to have a problem, optionally of varying degree, depending on the degree and nature of the match. That is, the rules may tell one what it is not, not what it is. The entries with such identified problems may then be deprecated, such as removed, corrected, deprioritized, or the like, thereby improving the final decision output.

For example, a set of navigation plan includes a first driving plan that has the vehicle turning right onto a street into the rightmost lane of the street, and a second driving plan of turning right to the middle lane of the street. The first driving plan may be determined to be matching the rule of entering a "dangerous situation" with another vehicle because there is another vehicle stopped in that lane, wherein "dangerous situation" is defined as in the RSS or other safety framework. Thus, this plan is eliminated and/or is flagged to be modified, and the second plan of doing a right turn into the middle lane of the street remains and becomes the prioritized plan. Although the first plan is the preferred plan in the absence of obstacles, it is replaced by the second plan in this case due to the presence of the other vehicle. The net result is improved decision making over using the highest priority or lowest cost plan provided by the generating phase.

The driving plan is then selected (306) from the remaining entries in the PDS, normally according to some measure of "goodness" on the entries. In one embodiment, a cost-benefit measure is applied to the PDS entries. For example, the travel time for different paths may be used as a measure, fuel efficiency may be used as another measure, and the paths may be ordered by this cost.

Commutative Action Rule-Based System (CARES).

A CARBS is defined herein as an RBS in which the actions are all commutative. That is, for any two rules Ri and Rj, performing the action RAi and then RAj is the same as performing the actions RAj and then RAi. This commutativity includes not changing the variables in the conditions of the rows such that the conditions evaluate differently. That is, performing the action RAi does not make the condition for Rj false if it previously matched, and vice versa.

With a CARBS, the actions may be performed in any order, so there is no need for the conventional "conflict resolution" processing (204) that is part of normal rule-based systems of FIG. 2, and the whole question of conflict resolution strategy is irrelevant. It is therefore possible to execute multiple actions in a processing round without having to rematch after each action execution, unlike a general condition-action rule-based system because no action changes a condition that was matched to false or changes a condition that was false to be true. It is also feasible to execute the rules in parallel with suitable concurrency control on shared data.

Figure 4:
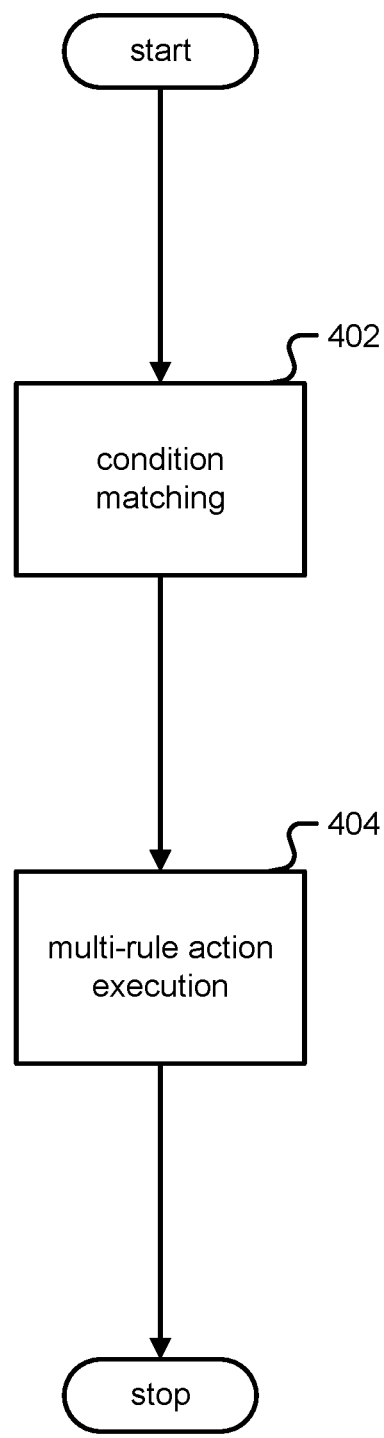
FIG. 4 is a flow chart illustrating an embodiment of a process for a CARBS execution.

FIG. 4 is a flow chart illustrating an embodiment of a process for a CARES execution. In one embodiment, the processing round for a CARBS is simplified to: match (402); and/or act (404); as illustrated in FIG. 4. Because an action in a processing round does not affect the condition of another rule, the matching as well as the actions may be easily performed in parallel and there is no need for conflict resolution (204). Thus, an optimized CARBS of FIG. 4 may be substantially more efficient than a general rule-based system of FIG. 2, as well as being substantially simpler in implementation and behavior.

In one embodiment, a CARBS is used in the filtering phase (304) of FIG. 3, by restricting the actions during filtering to commutative actions. In one embodiment using a CARBS for filtering (304), the action is restricted to deletion from the PDS. This optimization recognizes that the deletion-only filtering only entails commutative actions, as required for a CARBS. That is, deleting an entry in the PDS is commutative with any other deletion or even deletion of the same entry, for example by making deletion idempotent.

Automatic Root Cause Analysis (ARCA).

Systems may have numerous sources of faults, ranging from equipment failures to computer hardware failures to software failures to operator errors. In complex systems, there are many dependencies between interconnected components. Mechanisms for monitoring systems may also be subject to failure as well. Because of dependencies, the failure of one component may lead to another indicating a fault condition and/or symptom. Cascading faults may lead to a large number of alerts, making the task of determining a root cause fault quite difficult. As referred herein, these extra alerts are "symptoms" of the root cause fault.

Traditional approaches to automating root cause analysis have tried to find root causes by looking for statistical correlation between faults, assuming that a strongly correlated fault is the root cause. However, correlation may not indicate causation. Another related statistical approach is to use machine learning techniques to "recognize" different failure scenarios. However, the reliability of this approach is low unless a very large collection of labelled training sets are available which may be expensive and/or impractical.

Automatic root cause analysis (ARCA) using ternary fault scenarios is an alternate technique. A "symptom" is referred to herein as a named and/or defined state of some component of a monitored system that is important to distinguish one fault scenario from another. A "ternary system" as referred to herein may be used for ARCA in part by using a symptom value corresponding to an "unknown" value corresponding to a symptom value that is not known, and a "don't care" value, also referred to as an extraneous value corresponding to a symptom not needed for a particular analysis. In one embodiment, each symptom value is restricted to being one of: true, false, or unknown. Thus, a symptom value is referred to herein as being a "ternary" value. In one embodiment, the unknown and the don't care values are designated by the same value, distinguished as one or the other based on the context of usage.

CARBS and ARCA.

Figure 5A:
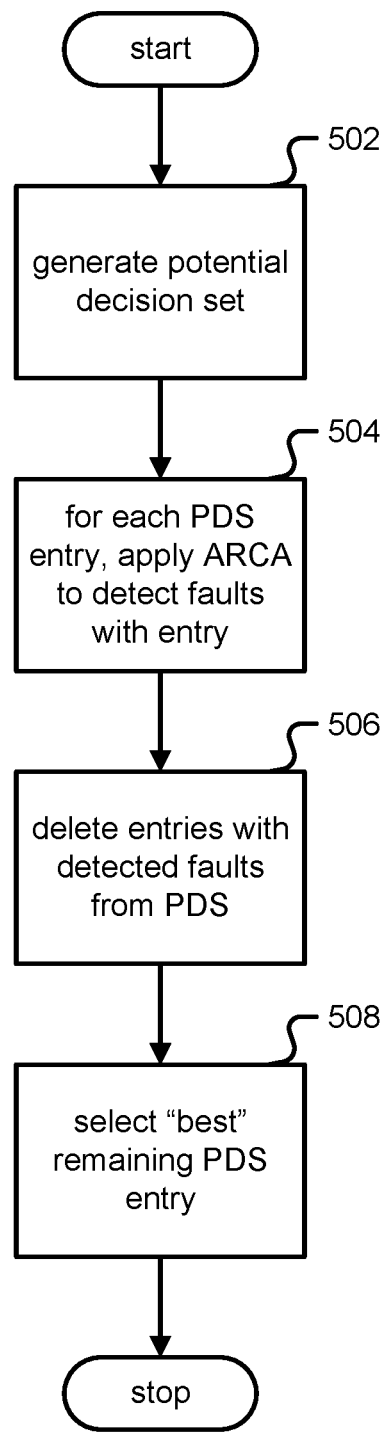
FIG. 5A is a flow chart illustrating an embodiment of a process for an ARCA-based decision processing sequence.

FIG. 5A is a flow chart illustrating an embodiment of a process for an ARCA-based decision processing sequence. In one embodiment, the sequence of FIG. 5A is the ARCA-based version of FIG. 3, for example such that a CARBS is an ARCA module, where it is configured and deployed to find faults with the entries in the decision set. After generating a potential decision set (502), an ARCA may be used as a CARBS wherein each row in the root cause table (RCT) is effectively the condition associated with a rule, and the action is simply to report matches, which correspond to the root cause faults it is to detect, and this reporting is commutative. Continuing the above example, the root cause fault of the first driving plan may be identified as "dangerousSituationWithStoppedVehicle". The rules are used to identify root cause faults for the ARCA system by identifying faults with each potential decision (504). For example, the rule: navigate without entering a dangerous situation with another vehicle is converted into the root cause fault "dangerousSituationWithAnotherVehicle". After an entry has a fault detected, it is deleted (506), and a 'best' entry is selected from the remaining PDS entries (508).

In some cases, it is useful to convert a rule into multiple root cause faults to provide additional information on the problem with an entry in a PDS. For example, in a navigational application, the system may be able to determine the type of many obstacles and some aspects of their behavior. Thus, it may recognize that an obstacle is a vehicle, rather than a road barrier, and it may recognize it as stopped rather than slow moving.

Thus, a general rule such as: navigate without entering a dangerous situation with an obstacle may be converted into a collection of root cause faults such as: dangerousSituationWithUnknownObstacle; dangerousSituationWithSlowMovingVehicle; dangerous SituationWithStoppedVehicle; dangerousSituationWithPedestrian; and potentially several more. Additionally, the type of the obstacle may be used to qualify the nature of the dangerous situation. For instance, dangerous situation with pedestrian may be determined based on parameters specific to the pedestrian as distinct from an automobile.

The additional information provided on the problem with an entry in the PDS may be used to generate additional navigational plans or how to further refine the PDS. For example, if the root cause problem with a navigational plan to turn right into the rightmost lane has the problem of "dangerousSituationWithPedestrian", it is not advisable to select the alternative of turning into the middle lane even though that may avoid a collision. Similarly, if the dangerous situation is with an unknown obstacle.

On the other hand, in some cases it is desirable to keep the RCT as small as possible to minimize the matching cost to allow it to fit into a mobile and/or hardware device, such as a ternary CAM. For these cases, an alternate strategy is to use the extra refinement of rules to avoid false positives and provide information that is not readily available from the identified root cause. In such a case, the object specified in the root cause may be determined to be a pedestrian after a match, rather than providing this distinction in the RCT, avoiding the attendant increase in rows.

In one embodiment, the identification of each root cause is structured so that a root cause may be easily parsed to determine the generic problem and the associated parameters. In the above example, the generic problem is a dangerous situation and parameters are "vehicle" and "stopped".

In one embodiment, an ARCA module supports multiple matches to a given input (504). The decision making process may be informed of all the problems with a given PDS entry, thereby being able to respond more effectively. Because of the CARBS constraint, there is no problem with processing multiple matches that are produced as a result of a single matching process.

Ternary Matching and ARCA.

In one embodiment, the CARBS condition matching is implemented using a ternary system for ARCA. As described above, complex monitored systems may have numerous sources of faults and even the mechanisms for monitoring such a system are subject to failures as well. For example, a temperature sensor monitoring a refrigeration system can fail, either permanently or intermittently, indicating incorrect temperatures for the system being monitored.

Component dependencies may introduce further complexity, for example, the cooling coils in a refrigeration system depend on correct operation of the compressor to provide condensed refrigerant. These dependencies arise from the interconnection of these components. As described above, the failure of one component may lead to another indicating a fault condition/symptom. Consequently, when one component has a fault, it may lead to cascading faults in the components that are dependent on the faulting component, making the task of determining the actual root cause fault difficult. In some cases, the root cause may not even be present among the alerts provided to the operator.

For example, if a cable fails between two computer network switches, there may be a flood of alerts from the switches at either end of the cable. However, there is typically no alert directly indicating the cable break because there are no sensors directly on the cable able to detect a cable breakage. A complex system may also be implemented in multiple layers, creating another set of dependencies. These layer dependencies are another source of alerts. For example, the above cable failure may cause the transport layer to indicate it has sessions timing out because no acknowledgements are being received. Similarly, a misconfiguration at the IP layer may cause alerts at the TCP/transport layer and routing layer to be generated.

Traditionally, these extra alerts are referred to as symptoms of the root cause fault. Generating a large number of these symptoms as alerts makes determining the actual root cause more difficult. Using efficient matching of symptoms without requiring the use of statistical correlation between faults or impractical/costly large training datasets, an efficient way of encoding the principles of operation, the dependencies and causations, and the potential root causes that are known for an engineered system as a result of its engineered design is an improvement on ARCA. This efficiency reduces storage costs and/or decreases power consumption for processors in order to determine root cause analysis. This efficient way allows root cause analysis to be performed automatically and efficiently.

Symptoms and Fault Scenarios.

Figure 5B:
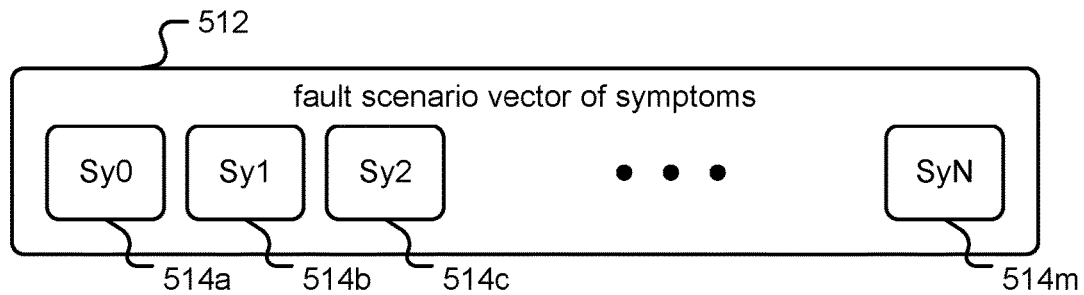
FIG. 5B is an illustration of a fault scenario vector of symptoms.

FIG. 5B is an illustration of a fault scenario vector of symptoms. One example of a symptom, noPower, is a symptom indicating that there is no power coming to the monitored system. The state of a symptom may be a known value or a special indication that it is unknown and/or don't care. The term "don't care" is commonly used in digital logic to indicate that the associated item is extraneous/not required. The ability for the processing to indicate don't care for a given symptom allows analysis to proceed even when that aspect of the state of the system is not actually known.

A "fault scenario" is referred to herein as a collection of symptom values that indicates the known and unknown fault state of a monitored system. Logically a fault scenario represents the state and/or potential partial state of the system from the standpoint of observed/determined symptoms that something is wrong or not wrong with the system. It may not indicate the full state of the system. For example, with a vehicle, the fault scenario may not necessarily indicate the position, velocity, and so forth of the vehicle, only the state of the symptoms, that is, the aspects that are needed to perform root cause analysis of faults.

As shown in FIG. 5B, in one embodiment, a fault scenario is represented as an array of values (512), where each entry (514a-m) corresponds to a specified symptom. For example, symptom Sy0 (514*a*) is a first entry, symptom Sy1 (514*b*) is a second entry, and so forth. In one embodiment, there may be multiple symptoms associated with the same metric. For example, there may be different symptoms for a temperature sensor being slightly high, moderately high, and extremely high. In one embodiment, there may be symptoms associated with the same metric based on different levels of derivative. For example, a symptom may be associated with a metric having a first derivative that is zero for too long, that is, it is constant, often indicating that the input sensor has failed. A symptom may be associated with the first derivative being too high, meaning that it is changing too quickly.

There may be additional symptoms associated with a metric that indicate that the metric is out-of-range or behaving incorrectly. In this case, the out-of-range symptom is set at the same time as a symptom indicating the metric is too high or too low, for instance. This "aggregate" form of symptom may allow a fault scenario to be specified in terms of "out of range," rather than having to cover both "too low" and "too high."

A match operator is defined between two fault scenarios s0 and s1 to return true bool isMatching=match (s0, s1);

if every symptom entry in s0 is either don't care or else matches as the value in the corresponding entry in s1. Note that the match operation is not commutative; match(a,b) may not necessarily be equal to match(b,a).

Root Cause Table.

Figure 5C:
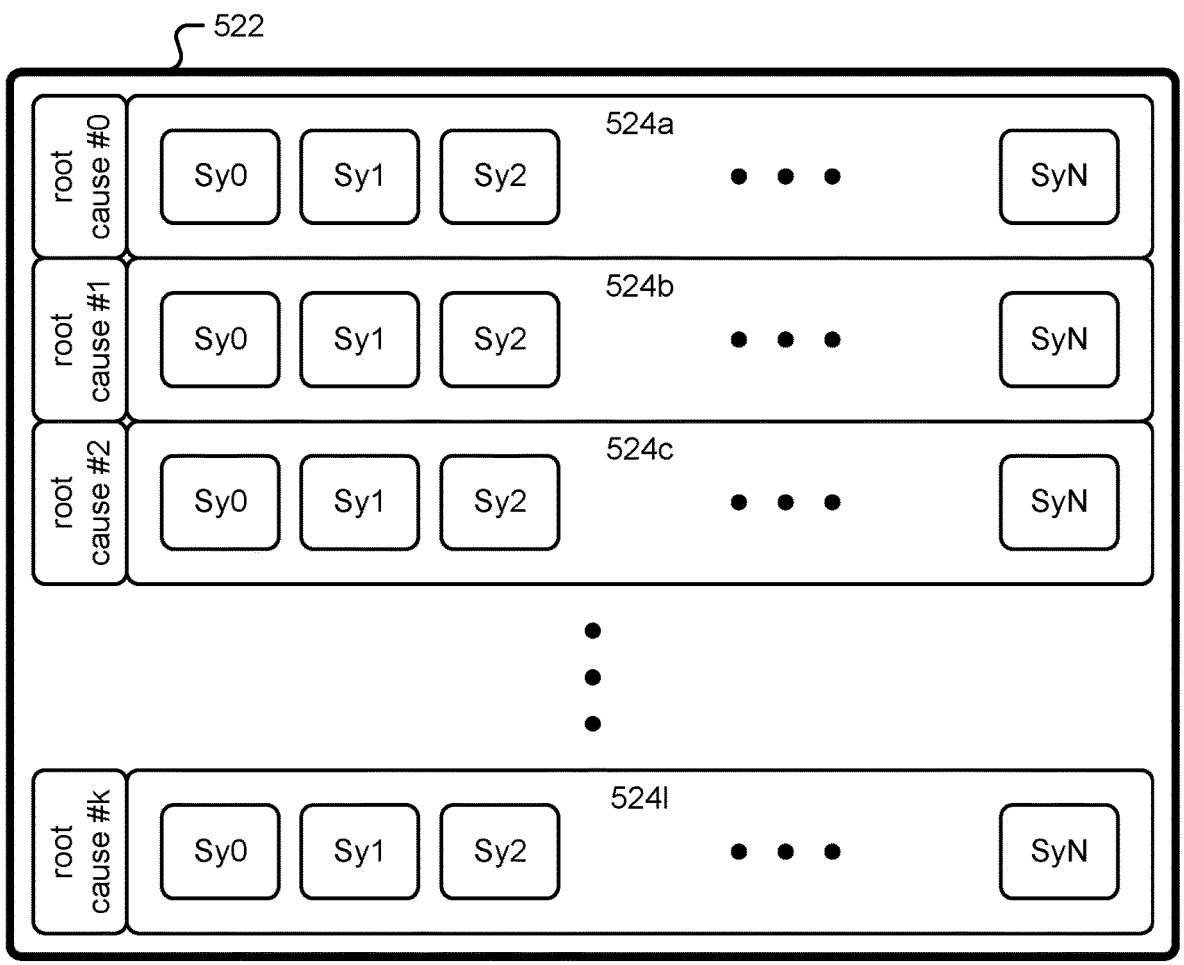
FIG. 5C is an illustration of a root cause table.

FIG. 5C is an illustration of a root cause table (RCT). An RCT is a table in which each row is a fault scenario that is labeled with an associated root cause. In this context, an unknown value for symptom in such a fault scenario is interpreted as don't care. For example, for a root cause "bad motor," symptoms in the row may be: noPower as false, motorNotRunning as true, and all other symptoms indicated as don't care.

In one embodiment, an RCT contains a row for every failure or event that can be the root cause, where each row indicates the symptoms that must be true for this to be the root cause, those that must be false, and the rest set as indicating don't care. Note that specifying more symptoms as specific values, rather than don't care beyond the absolute minimal for a given root cause can result in a root cause not being identified or matched because extra symptoms may not be known or are the opposite of that specified for the row. Consequently, it is important to specify the minimal set of known symptoms required to diagnose the system to the particular root cause associated with the row in the table. If a given root cause may have multiple identifying sets of symptoms, there are multiple rows in the RCT, as a row per set. A given root cause may have multiple corresponding rows because one row corresponds to a minimal set of symptoms and others correspond to the minimal set with additional symptoms that provide greater confidence in the root cause. For example, in the case of a power supply failure to a switch, the minimal set may just contain the "lossOfPower" symptom from the switch's current sensor while additional rows may contain that symptom plus "lossOfSignal" symptoms from the directly attached switches to the failed switch.

In one embodiment, each RCT row is represented in the same way as a fault scenario. As such, it may be referred to herein as a "potential fault scenario." As shown in FIG. 5C, an RCT (522) comprises k+1 rows (524*a*-304*l*), each row associated with a specific root cause with N symptoms per row. For example, root cause #0 is associated with the first row (524*a*). The values of the symptoms (204*a*-*m*) in each row (524*a*) are different from the other rows (524*b*-304*l*), each corresponding to a potential fault scenario for the associated root cause, as indicated by the root cause labeled #0 through #k.

In contrast to a potential fault scenario, the fault scenario determined from a monitored system is referred to herein as an "actual fault scenario." There may be multiple actual fault scenarios for a monitored system. One actual fault scenario may be a more detailed fault scenario for a particular subsystem compared to another. Another source of multiple actual fault scenarios is uncertainty regarding the faults. For example, one scenario may have a symptom corresponding to the temperature of the system being too low whereas another may have a symptom indicating that the temperature sensor has failed. In the latter case, it may indicate the temperature sensor-dependent symptoms as unknown.

In one embodiment, ternary symptom values are used so that a symptom is represented as a "known" bit indicating known or unknown by being true or false respectively, and a second "value" bit that indicates true or false, which is only interpreted as such if the known bit is set to true. A quaternary nomenclature is referred to herein of [a, b] wherein a is whether a state is known (0=unknown, 1=known) and b is a value associated with the state (0=false, 1=true). With this convention, an interpretation of [0,1] that is allowable is that an associated symptom is not known to be true: Compare [0,0] which may correspond to unknown with [0,1] which may be interpreted as not known to be true. Note that a [0,1] symptom in an entry in an RCT may match to an input being false or unknown unlike [0,0], which corresponds to "don't care" and matches to any value in the corresponding entry in the actual fault vector. Thus [0,1] may not necessarily be treated the same as [0,0] and/or not allowed.

Figure 5D:
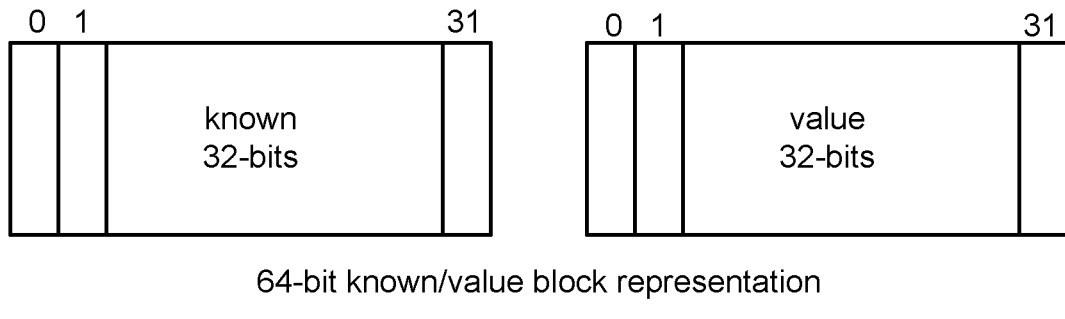
FIG. 5D is an illustration of a 64-bit block representation of known and value bits.

FIG. 5D is an illustration of a 64-bit block representation of known and value bits. In one embodiment, a fault scenario is represented as blocks of bits that are partitioned into a sequence of "known" bits and a sequence of value bits. For example as shown in FIG. 5D, an implementation uses 64-bit blocks, wherein the first 32 bits are "known" bits and the second 32-bits are value bits. Referring to FIG. 5D, if the i-th known bit is 1, the i-th value bit indicates if the corresponding symptom is true or false; otherwise the actual value is not known and the i-th value bit is not meaningful. This embodiment allows efficient determination of the "known" bits in a block. It also means that a block need not be stored if all the symptoms in a block are unknown or don't care. That is, absence of an explicit storage of a block is interpreted as that block containing only "don't care" values.

Figure 5E:
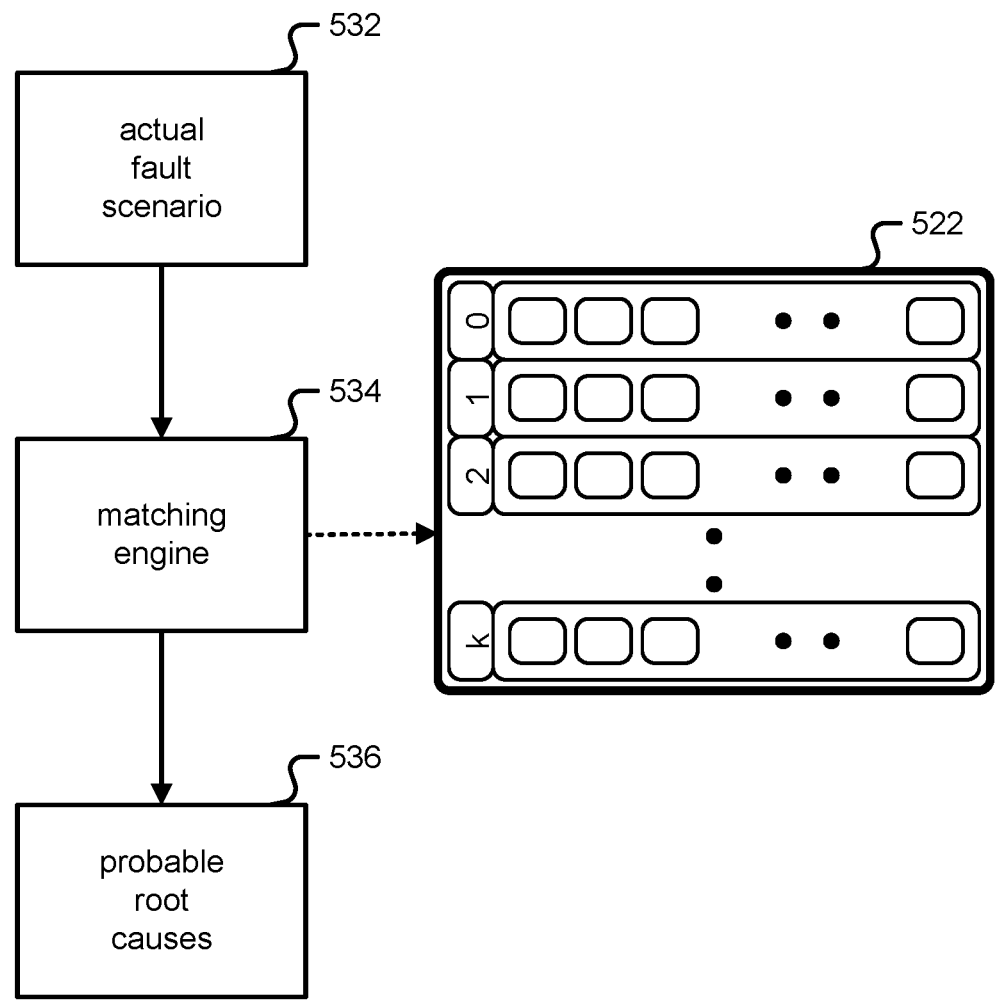
FIG. 5E is an illustration of a root cause analysis technique.

Root Cause Analysis. FIG. 5E is an illustration of a root cause analysis technique. Actual root causes associated with a given actual fault scenario (532) are determined by using a matching engine (534) to match the given actual fault scenario against each row in the RCT (522), and indicating the ones that match as probable root causes. That is, if a fault scenario matches a row such that each entry matches by the above match(a,b) operator, the root cause associated with that row is output as a probable root cause (536) associated with this symptom, as shown in FIG. 5E.

This matching is essentially "ternary matching" but unlike the ternary matching provided by a ternary content-addressable memory (T-CAM), the input fault scenario is also ternary. A T-CAM may however be used as part of an efficient/hardware system of matching. There may be multiple simultaneous root cause failures in a monitored system. Therefore, it is possible that the matching matches multiple rows in the RCT, one per root cause. For example, a motor may fail at the same time that a temperature sensor has failed by indicating completely unrealistic readings. There may be multiple rows that map to the same root cause. This handles the case in which a root cause failure may be indicated by different sets of symptoms.

In one embodiment, the row representation does not explicitly store the don't care entries. That is, the absence of an explicit designation or representation of an i-th symptom is interpreted as don't care for the i-th symptom. In one embodiment, symptoms are aggregated into blocks that are associated with logical units or components of a monitored system. For example, an embodiment may use the 64-bit block of known/value bits described earlier. Thus, if a component is not relevant to a particular root cause, the entire block need not be stored. Each row may then require a relatively small amount of storage. Typically, most rows are relatively sparse because only a small subset of symptoms are relevant to a particular fault so only a small percentage of that row is actually stored, with the rest by default being don't care.

The representation of arbitrary fault criteria is achieved by using multiple symptoms. For example, one root cause is evidenced by a temperature being very high, yet another is evidenced by it being high, and another evidenced by it being slightly high. That is, there may be a symptom entry in each row for each of these levels.

A key element is indicating the symptoms that are known to be false as a symptom, that is no fault, as well as what is known to be true, that is a fault is present, while still allowing for unknown or don't care. The false case effectively filters out symptoms that are due to another reason, for example the compressor is not working, but actually there is no power, which is the root cause. Thus, a subsystem SSi that is dependent on a number of other subsystems may need to have all these other systems known to be working before a fault in subsystem SSi may be reliably identified as a root cause.

In CARBS, each element of a conjunctive condition is represented as a ternary symptom. Thus, a condition of the form (C0 & C1 & . . . & Ck), where Ci is a subcondition, may be represented as a row in which the "symptoms" corresponding to these subconditions is set to true. If Ci is actually the negation of some condition C' i, the symptom corresponding C' i is set to false instead.

A condition of the form (A or B) may be converted into two rows, one corresponding to A and the other corresponding to B. A post-processing phase may merge these two matches if so desired when both match or convert to a non-match if exclusive OR semantics are required. With this approach, each row of the RCT-equivalent table is viewed as representing a property of some element that is effectively the condition associated with a rule that needs to be true for this object. The matching algorithm is then modified to report mismatches rather than matches. In one embodiment, a binary symptom is used instead of a ternary symptom.

Case Example: Autonomous Vehicle Driving/Navigation.

To illustrate the disclosed techniques in a dynamic scenario, its use is given context in the domain of autonomous vehicle navigation in an environment with other autonomous or human-driven vehicles and other obstacles where the dynamic information about these other vehicles and obstacles is gleaned from sensors.

In one embodiment, a CARBS module is used with the scalability and efficiency of ARCA, for example using ternary matching. In one embodiment, the associated RCT is generated automatically from a high-level fault model and/ or "compiled" using known techniques. As referred to herein, compiling a high-level fault model is any technique of automatic generation of an RCT from said high-level fault model. For example, a property or condition is specified similar to a root cause, and this condition propagates as "symptoms" out to other elements as necessary to make this condition observable. Consequently, the symptoms in the rows of the RCT-equivalent table are set to match the condition of the rule. As described herein, it is straightforward to convert into these conditions into their negations and use a match to the resulting row to correspond to a fault in the selected potential decision. Without limitation, for clarity the following is described in ARCA terminology, using an ARCA module to detect rule matches to entries in the PDS.

Figure 6:
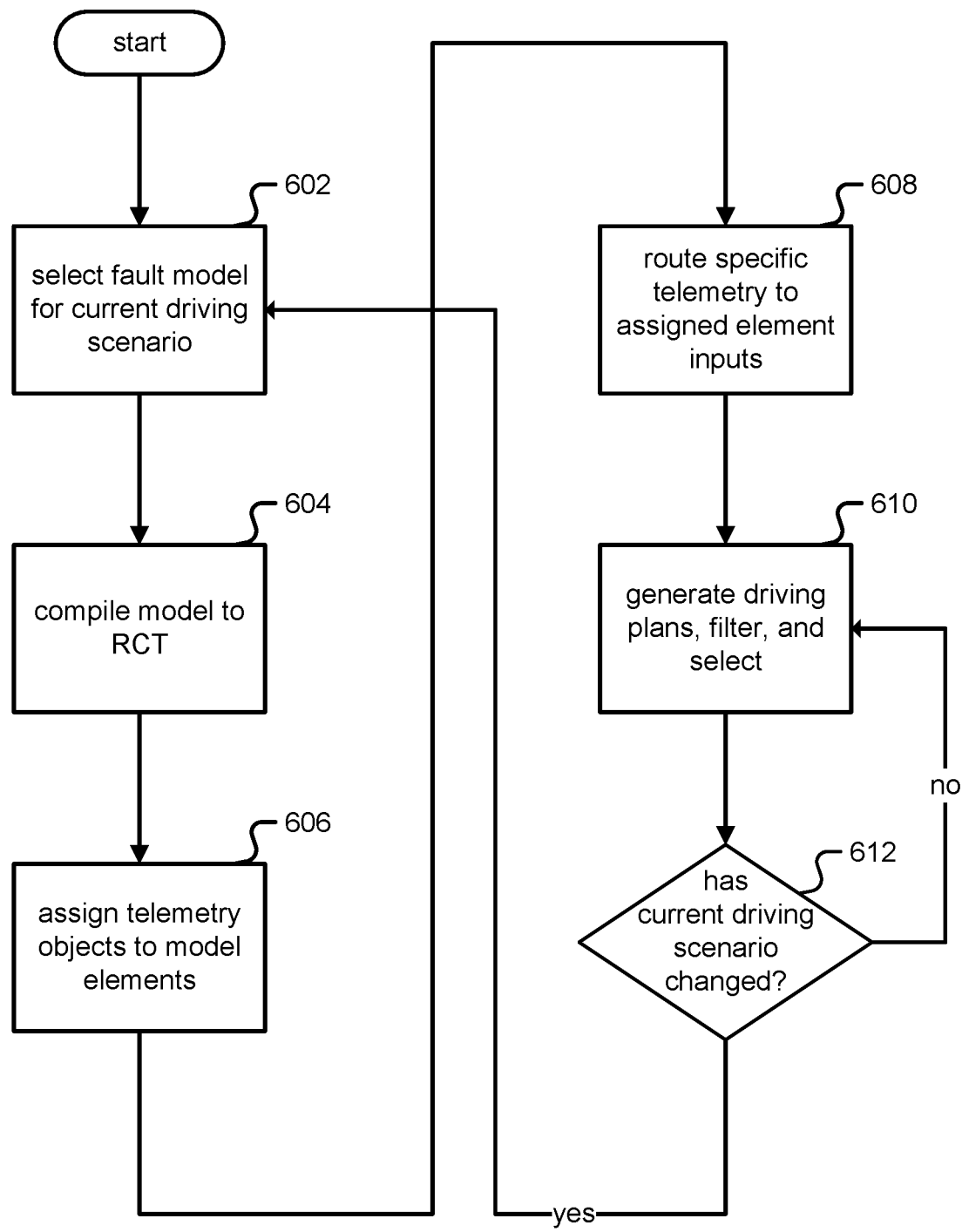
FIG. 6 is a flow chart illustrating an embodiment of a process for an ARCA-based autonomous driving processing sequence.

FIG. 6 is a flow chart illustrating an embodiment of a process for an ARCA-based autonomous driving processing sequence. In one embodiment, the sequence of FIG. 6 is based on ARCA-based decision making on driving plans using the sequence illustrated in FIG. 5. Before the flow of FIG. 6, a series of models are generated apriori for different driving scenarios, for example a fault model "dangerousSituationWithStoppedVehicleVi". Each model may include elements corresponding to the navigated vehicle as well as other vehicles and obstacles.

In (602), a fault model is selected corresponding to the current driving scenario. In (604), based at least in part on the selected fault model, the RCT is compiled. In (606), telemetry objects are assigned to model elements, wherein a telemetry object may be a vehicle, obstacle, pedestrian, and so forth. In (608), route specific telemetry is assigned to element inputs, wherein route specific telemetry may include lane position, road identification, pedestrian crossways, and so forth. In (610) the GFSDP is executed; in one embodiment, this includes the steps of FIG. 5. If it is determined in (612) that the current driving scenario selected in the original (602) has changed, control is transferred back to (602) for new selection; otherwise, control is transferred back to (610). In an active driving scenario, the sensors are read every 100 milliseconds (for example) and these sensors indicate a change in the current driving scenario, thus causing control to transfer back to (602).

Actual and Potential.

In one embodiment, to avoid having the model be specialized to each specific scenario, the model includes a collection of "potential" vehicles and obstacles as described in (606). Then, a potential vehicle or obstacle only becomes "actual" when it is paired with telemetry that has detected an actual object in the environment. Until that point, it is inactive and therefore does not interact with the navigated vehicle, so effectively does not exist in the environment from the ARCA standpoint, that is, is not a source of a root cause fault.

To illustrate, a vehicle may be proceeding down a residential street with no vehicles in sight when a vehicle appears in front of it, having pulled out of a driveway. At this point, the telemetry is assigned to one of the potential vehicles in the model and RCT and it is marked as actual in (606). One way to mark it as actual is to simply set its position relative to the navigated vehicle instead of some very distant location that all potential vehicles start with. In this way, the model and the generated RCT do not need to change on the dynamic appearance of a new object yet there are no extraneous root cause faults identified.

Time.

In one embodiment, to incorporate time into ARCA and the RCT, each object is realized as a collection of elements in the model, corresponding to a time series, namely the object at time t0, object at t1, object at t2, and so on to time tn. Each of these elements has its own copy of the symptoms represented in the RCT. The setting of these symptoms corresponds to the extrapolation of this object forward in time based on telemetry information. In particular, with the vehicle traveling at velocity v, the extrapolated position of the vehicle at time t is its current position plus v*t, possibly taking into account acceleration, and so forth. More sophisticated models of the other vehicle may be used. For example, if the other vehicle is approaching an intersection, its velocity may be anticipated to decrease.

For the navigated vehicle, its position at time ti corresponds to its planned position according to the proposed navigation plan being evaluated. The meaning of t0 is the current time at which the ARCA module is being run, so t0 is the current position of the navigated vehicle. Therefore, the number of entries in the time series may be limited to provide sufficient reaction time while still providing accurate ARCA. For example, travelling on a residential street at 25 MPH, using a time series of 20 entries with each entry in the series representing an additional second, there is 20 seconds of reaction time, which is adequate to avoid dangerous situations yet provides a second-level accuracy on position of vehicles and obstacles. At highway speeds, similar parameters apply except one would require greater distance between vehicles.

Symptom Propagation.

In one embodiment, the navigated vehicle (NV) object at time ti is connected to each other vehicle and obstacle object at time ti. The root cause specific to each vehicle instance in the navigated vehicle is propagated to the corresponding obstacle across these connections to the NV. For example, "dangerousSituationWithStoppedVehicleVi" is specified to propagate from each connected vehicle Vi as the symptoms "dangerousSituationWithNv" and "vehicleStopped". This is referred to herein as symptom propagation. These are observed symptoms which are set true if the navigated vehicle's position would be too close to Vi and then if Vi is stopped. Thus, if a given connected vehicle Vi is actual as above and its position at time ti is extrapolated to be within a designated distance of the navigated vehicle NV at time ti, the "dangerousSituationWithNv" symptom is set for this vehicle.

In one embodiment, if the telemetry indicates that a vehicle is stopped, that is zero velocity, the "stopped" symptom is set for this vehicle. Consequently, the model is compiled into a RCT (604) with a row the corresponding "dangerous situation with stopped vehicle Vi at time ti" and this row is matched when these two specific symptoms are set. In this way, the ARCA may identify a potential dangerous situation well into the future if the currently proposed navigation plan is followed. It may also indicate the time at which this is to occur.

For example, if ti is well in the future, the system may select an alternative plan. However, if ti is almost immediate, as when the obstacle suddenly appears, the system may initiate emergency braking or an evasive maneuver. In particular, such a rule illustrates a key benefit of rule-based decision making, where an NV system determines that the NV will emergency brake if it detects an unknown obstacle with which it is likely to have an immediate collision. Thus, this basic safety property may be guaranteed. Unlike ML and/or deep learning (DL) approaches, a system using the techniques disclosed herein may thus be guaranteed to act safely when it does not understand the scenario.

Safety Perimeter.

In one embodiment, to avoid missing detection of a dangerous situation arising with an object between timepoints, the size of the safety perimeter around an object may be expanded with increasing speed relative to time step granularity. This is similar to the extended bounding geometry used in prior art collision detection methods.

Speed.

Besides basic rules on avoiding dangerous situations, such as potential collisions, the model may include rules such as lower and upper bounds on speed conditioned on its state relative to the rest of the environment. For example, the navigated vehicle may have a rule to be travelling at least 55 MPH on highway if the speed limit is 65, the road conditions are good and there are no immediate obstacles or dangerous situations.

Navigational Scenario Models.

In one embodiment, to avoid having an excessively large RCT and associated matching overhead, there may be a model for each of the navigational scenarios: traversing a residential street; approaching a stop sign; turning right at a 4-way stop; and so forth. For example, a residential driving rule set may have a rule that prohibits maintaining speed or increasing speed if a ball rolls in front of the vehicle, whereas a freeway driving rule set may not mention balls but prohibit staying in the same lane if there is a left adjacent lane that is available and there is a stopped vehicle in the right adjacent lane, which on the other hand is allowed in residential driving. The system may then switch to using the associated RCT as the driving scenario changes. For example, it may have a current RCT corresponding to traversing a residential street and then switch to using the RCT corresponding to "approaching a stop sign" as it nears the end of the street. The system may either have a full collection of RCTs available for selection at any time or else compile an RCT from a model just before it is needed if not already cached in (604).

In this example application of autonomous vehicle driving/navigation, there are reasonably less than 30 objects (606) to provide for, a comparable number of generic root causes per driving scenario, approximately 10 timesteps required, and the resulting model and RCT may end up with roughly 9,000 rows. That is reasonable to handle for efficient root cause analysis, particularly with an efficient ARCA implementation. Using techniques described above, RCT matching may be performed in parallel and/or in hardware for faster response.

In one embodiment, ARCA is performed in (610) on a set of potential navigational plans in sequence from "best" to worst using a metric such as cost, and terminating when a plan is identified with no faults. However, a model may be expanded to handle multiple plans at the same time by having for each logical object, one per time-step and per plan. For example, it could include one normal plan as well as a couple of evasive maneuver plans so that in the case of an imminent collision, it is able to react to one or two options to react quickly to a dangerous situation. The imminent collision fault condition only requires propagation for the next few time steps so introduces fewer RCT rows when compiled (604). In that vein, having eventualCollision only propagate to later time steps means the combination of the two is not increasing the number of RCT rows.

Note that model complexity is dealt with when the model is compiled (604). It is the size of the generated RCT that incurs a real-time cost, namely the cost of matching actual symptoms to the RCT rows and the space cost of the RCT itself.

Other Improvements.

A variety of other improvements are available. In one embodiment, hardware support such as a T-CAM may be used to perform more efficient matching. In this case, the RCT is loaded into the T-CAM when a new driving scenario is selected at (602) and then match vectors are input to the T-CAM for each entry of the PDS on each decision making round (610). In this case, because a T-CAM may process many matches per millisecond, it may be preferable to have the model correspond to a single point in time, not a time series, to thereby reduce the size of the RCT. Then, if a plan provides 20 waypoints for its trajectory, a match vector is generated for each waypoint and matched using the T-CAM. If each match takes 50 microseconds, evaluating 20 waypoints requires 1 millisecond. Thus, five different driving plans may be evaluated in 5 milliseconds even in the case of the first four plans being eliminated. Thus, it becomes feasible to re-evaluate the driving plans every 100 milliseconds, and possibly more frequently if necessary.

In one embodiment, another optimization is dynamic model generation of the RCT, driven off of a database of different meta-scenarios of intersections, freeway exits, on-ramps, and so forth. For example, consider a four-way stop where NV is turning left. A model that is more specific to the current scenario may be produced on demand, resulting in a smaller RCT and improving efficiency for the current scenario in terms of matching.

A variant of this application is using the RSS model to assign blame if the navigated vehicle is involved in an accident. As per RSS, it is impossible to guarantee that no accident occurs. However, if the navigated vehicle fails to take proper action in the case of a dangerous situation, it is at fault. Similarly, and more expected, if another vehicle fails to take proper action, as defined by rules in RSS, in the case of a dangerous situation, or creates a dangerous situation causing an accident, it is at fault. The blame determination, yet another decision, may be determined by applying ARCA to determine root cause of the accident based on the same telemetry, including historical telemetry.

This application shows benefit. By performing ARCA on a PDS separate from PDS generation, it avoids complicating the already complex task of generating potential navigational paths. It also provides a simple guarantee that the NV is prevented from performing an unsafe action, given any unsafe driving plan is filtered out by the ARCA rules, assuming these rules properly reflect safe behavior, such as those specified in RSS. It also means that the rule-based filtering may use the optimizations available to a CARES system, of which ARCA may be viewed as an instance. By using recently developed efficient ARCA RCT representation and matching and the approaches and optimizations described herein, the rule evaluation may be performed relatively efficiently and thus frequently, allowing the NV to quickly react to changing situations.

Note that, with the exception of off-road driving, the preferred driving plan generated by current road navigation programs is acceptable most of the time with minor variations and refinements, like when to change lanes and exact placement on the road. That is, it is infrequent that other vehicles and obstacles are going to cause a problem with the conventional plan. Thus, the NV may be expected to drive as expected most of the time. On the other hand, in some confusing or unexpected situation, it is guaranteed to slow down or stop, thereby ensuring safe operation—a strong contrast to the lack of such guarantee with traditional statistical approaches. With off-road, the automated driving may depend more on the environment.

Sensor Interpretation Validation.

Another application domain for incorporating rules into complex automated decision is validating the interpretation of sensors or data input. As one specific application of this validating sensor interpretation, an autonomous vehicle has sensors to detect not just the existence of a potential obstacle, but also, what the obstacle is, its velocity and possibly acceleration.

With uncertainties from camera images, distortions caused by rain and sunlight, the difficulty of interpreting images, it is traditionally difficult to achieve high accuracy. Moreover, the traditional approach, based on statistical inference/machine learning, is based on a training set. Encountering sensor input that departs from the training set increases the uncertainty that the interpretation generated is correct and thus reduces reliability. Furthermore, carrying this uncertainty into the navigation using traditional methods significantly complicates the navigation and also tends to make the driving excessively conservative and/or slow compared to a human driver.

Applying the techniques discussed herein, rules are applied to validate that a candidate identification of an object and its properties conforms to rules associated with that type of object. In one embodiment, if the rules eliminate all of the candidate interpretations, the image and scenario is recognized as unknown/uncertain, and this determination may be used to prompt more conservative driving or perhaps halting the vehicle, thereby increasing the safety of NV operation.

Figure 7:
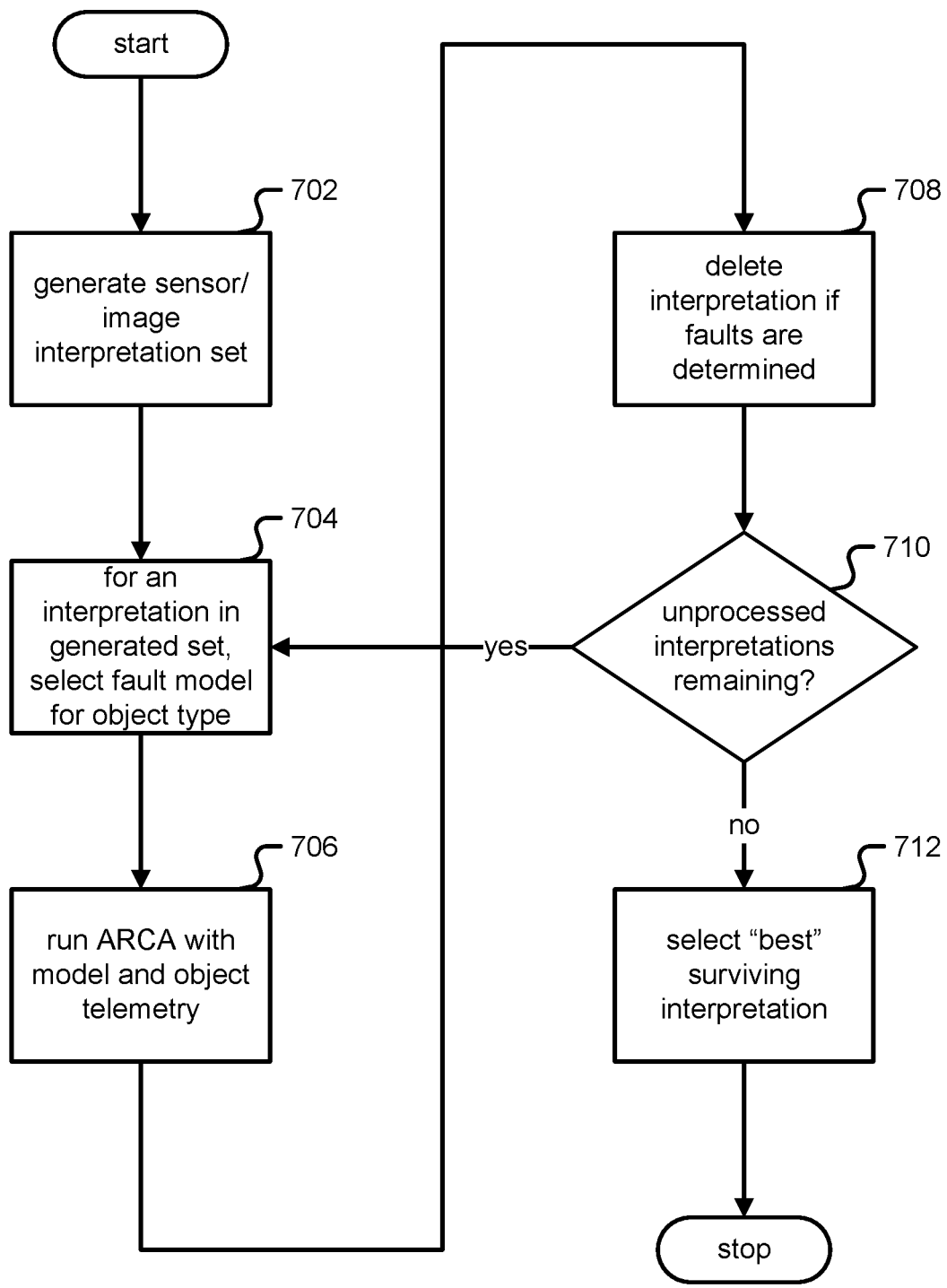
FIG. 7 is a flow chart illustrating an embodiment of a process for an ARCA-based sensor interpretation processing sequence.

FIG. 7 is a flow chart illustrating an embodiment of a process for an ARCA-based sensor interpretation processing sequence. In (702), traditional techniques including machine learning are used to generate a set of hypotheses that represent potential interpretations of sensor input. For each such type of object, there are a set of rules that such an object obeys. For instance, in the case of a bicycle, a rule may be that its speed is greater than zero but less than 25 MPH. From these rules, one may identify a set of root causes for an object not complying with these rules. For instance, in the case of a bicycle, a root cause could be "excessivelyFast", which propagates to the distance between the time series associated with the bicycle being too far apart. Another example may be an "excessivelyWide" root cause, which propagates to the width of the object as determined in the image being too large.

Thus in (702) the sensor data processing produces a set of potential image/sensor interpretations, optionally ordered by confidence. In (704), for a given interpretation in the set generated in (702), a fault model for the object type is selected. In (706), the given interpretation is root caused using ARCA against the sensor input telemetry to check for faults with this interpretation. In (708), if the given interpretation exhibit faults, it may be eliminated. In (710), control is transferred to (704) if an unprocessed interpretation remains, otherwise control is transferred to (712), wherein the interpretation of highest confidence among the remaining interpretations in the set is selected.

In some cases, separate telemetry data is used as part of the filtering. For instance, cameras and image processing may be used to detect that an object "looks like" a bicycle where as a range-finder may be used to determine its velocity.

The improvement of an optimized CARBS approach is that these rules may be applied rapidly and efficiently, so the image interpretation process is not significantly delayed by adding in a filtering step. Moreover, it is feasible to have a model that contains one instance of each potential interpretation, and assign "symptoms" from various metrics to each of these instances, wherein then ARCA matching in a single match may indicate with each possible interpretation.

For example, if the object possibilities are: motor vehicle, bicycle, pedestrian, and road barrier, the model may include an instance of each and root cause problems with each type of object, so the ARCA matching may detect "faults" with interpreting the object as each one of these, if any, in parallel. If it does not detect a problem with any of the interpretations, the selection would normally use the most probable interpretation, and/or the least dangerous interpretation.

Fusing Multiple Images.

Another related application domain for incorporating rules into complex automated decision is fusing multiple sensor/data input interpretation, for example fusing multiple images. In an application such as image interpretation, in particular medical image interpretation where there may be multiple images of the same part of the body, such as that of a kidney with a suspected tumor. Various different potential interpretations may arise from each image. In this case, the images correspond to different views resulting from different angles but at the same time, by contrast with different views resulting from different times, as arises with vehicle navigation.

Applying the techniques described herein, an object that corresponds to some feature at each of the viewing angles is analyzed. Rules are used to generate root cause faults to identify problems with each image interpretation, if any. The differently viewed objects are connected by matching features in the different images to common elements to allow symptom propagation and domain knowledge to be applied to specify how symptoms propagate within the model.

Figure 8:
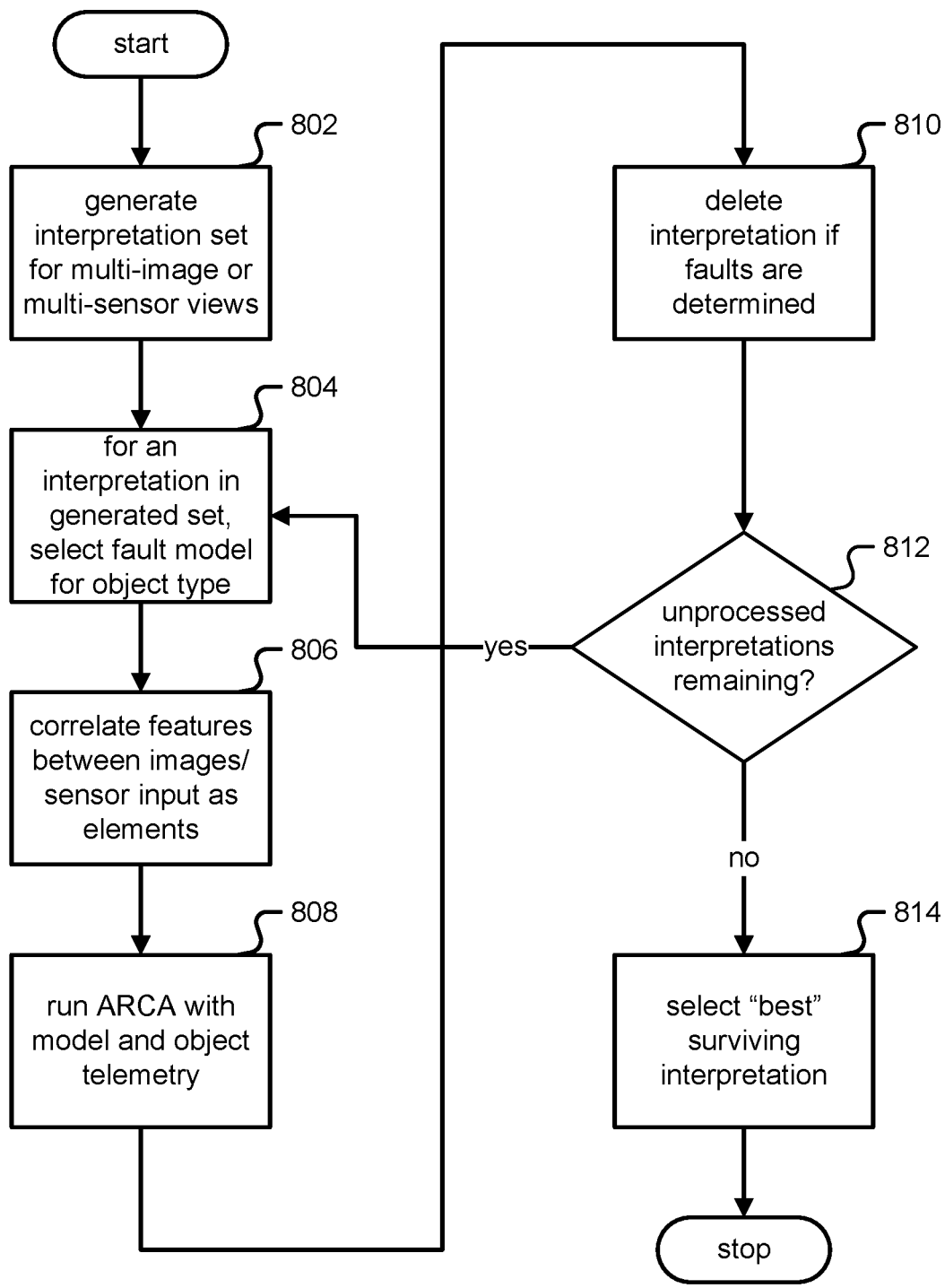
FIG. 8 is a flow chart illustrating an embodiment of a process for an ARCA-based sensor fusing processing sequence.

FIG. 8 is a flow chart illustrating an embodiment of a process for an ARCA-based sensor fusing processing sequence. In (802), traditional techniques including machine learning are used to generate a set of hypotheses that represent potential interpretations for multi-sensor and/or multi-image views. For example, if a growth is potentially identified on the top-view of the kidney, a side view should also indicate a growth at the same location.

In (804), for a given interpretation in the set generated in (702), a fault model for the object type is selected. In (806), features are correlated between images/sensor input as elements and in (808), the given interpretation is root caused using ARCA against the sensor input telemetry to check for faults with this interpretation. Thus, a model specified for kidney diagnosis of tumors would root cause a fault with a given interpretation of a set of images of a kidney if there was a growth identified in one view but not in another view in which it should be visible. As refinement, (802) may generate a PDS containing both "small growth" as well as "large growth". ARCA in (808) may find fault with the large growth entry, but not with the small growth one, thereby refining the decision making to output a small growth.

In (810), if the given interpretation exhibit faults, it may be eliminated. In (812), control is transferred to (804) if an unprocessed interpretation remains, otherwise control is transferred to (814), wherein the interpretation of highest confidence among the remaining interpretations in the set is selected.

More generally, with medical applications, images may only be part of the input used to perform a diagnosis. For example, a patient's temperature, blood pressure and heart rate may also be measured. In this case, the image processing output may be treated as essentially setting symptoms and it is ARCA that is providing the actual output, that is the root cause fault is the diagnosis.

In one embodiment, the candidate image interpretations may be refined by using the techniques in FIG. 8 against the image interpretation, with this additional telemetry as input. For example, a high heart rate may be a counter-indicator to some interpretation of an image of the heart.

Rationale.

The approach of splitting decision making into three phases: generation, filtering and selection, significantly reduces the complexity of the generation phase when using rules. For example, without this split, if a rule is effectively (A and B) or (not A and C) if the condition C is only determined at the end of the generation, the generation needs to remember the A condition and yet may not determine whether the rule is followed until C is determined. Thus, in the worst case, non-split decision making still ends up only being able to do full rule evaluation after completing the generation.

The separate phases of the techniques described herein also make it feasible to use an independent and different means to generate of potential decisions. For example, rule-based systems are not normally being used to match against images. Rather, statistical/ML approaches are favored. With this separation, a statistical approach may generate the set of interpretations and then ARCA may be used to filter this set based on the rules. Strategically, it may be difficult to otherwise mix these two approaches in a single decision making step.

Using a separate rule-based system for just filtering significantly simplifies the rule-based system because its actions as a filtering mechanism are commutative, allowing the use of a CARBS as described herein.

Performing detection of rule matches using an ARCA implementation such as that using ternary matching is a further improvement by separating the setting of symptoms from the matching, so the setting of symptoms may be regulated based on the properties of the obstacle. For instance, if an obstacle is far away from the navigated vehicle, it may only update its symptoms by appropriate calculations over a longer time period versus one that is close by, whereas the filter actions needs to take place at a regular short interval such as every 100 ms, to detect dangerous situations arising with nearby obstacles. Moreover, the setting of symptoms may be performed in parallel by separate processes or threads. As well, the simple ternary representation of the RCT allows for a hardware implementation of the matching, such as a ternary CAM, dramatically improving the efficiency of matching.

Figure 9:
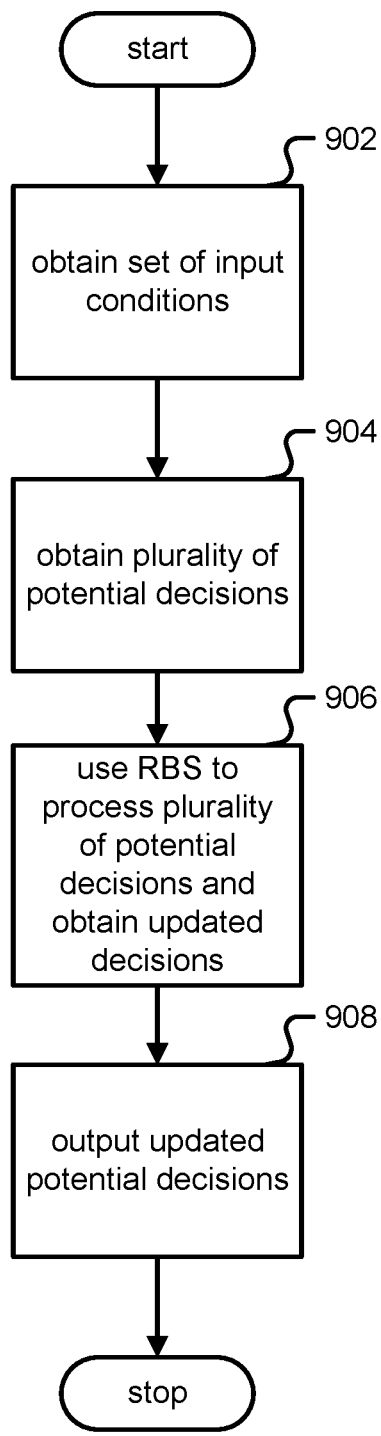
FIG. 9 is a flow chart illustrating an embodiment of a process for incorporating rules into complex automated decision making.

FIG. 9 is a flow chart illustrating an embodiment of a process for incorporating rules into complex automated decision making. In one embodiment, the process of FIG. 9 is carried out by the system of FIG. 1.

In (902) a set of input conditions is obtained. In one embodiment, the input conditions are determined based at least in part on telemetry. In one embodiment, telemetry includes measurements, properties, and/or attributes associated with a physical object.

In (904) a plurality of potential decisions is obtained, based at least in part on the set of input conditions. In one embodiment, to obtain a plurality of potential decisions comprises generating and/or receiving a potential decision. In one embodiment, a potential decision determines a potential action to take relative to a current state. In one embodiment, the potential action when carried out changes the current state and/or potential decision.

In (906) a rule-based system is used to process the plurality of potential decisions and obtain a set of one or more updated potential decisions. In one embodiment, to use the rule-based system to process the plurality of potential decisions comprises using the rule-based system to filter the plurality of potential decisions.

In one embodiment, the rule-based system allows the processing of the plurality of potential decisions to perform multiple corresponding actions on the selected potential decision. For example, a CARBS is an example of such a rule-based system. In one embodiment, the multiple corresponding actions may be executed in different orders without affecting rule conditions for the plurality of rules.

In one embodiment, the rule-based system is configured to perform automatic root cause analysis, wherein a root cause fault corresponds to a fault relating to a potential decision and the root cause fault maps to a rule action. In one embodiment, the rule actions include one or more of: deleting, reprioritizing, reevaluating, and/or modifying the one or more potential decisions that matches at least one rule in the rule-based system.

In one embodiment, the rule-based system specifies a plurality of rules. In one embodiment, a rule specifies a rule condition and a corresponding action, wherein when the rule condition is met, the corresponding action is to be performed. In one embodiment, the processing of the plurality of potential decisions includes 1) for a selected potential decision in the plurality of potential decisions, determining whether the rule condition is met for a selected rule among the plurality of rules, wherein the selected rule condition is dependent on, at least in part, the selected potential decision; and 2) in response to the selected rule condition being met, performing the corresponding action.

In one embodiment, such action affects the selected potential decision. In one embodiment, performing rule actions comprises deleting one of the identified one or more potential decisions. In one embodiment, determining whether the rule condition is met is based at least in part on a ternary match. In one embodiment, performing rule actions is performed in parallel.

In one embodiment, the selected rule condition is further dependent on, at least in part, the set of input conditions. In one embodiment, a best updated decision is selected from the set of one or more updated decisions based at least in part on a goodness metric, for example a metric associated with safety, time, quality, efficiency and/or cost.

In (908), the set of one or more updated potential decisions to be executed is output. In one embodiment, the plurality of potential decisions include potential navigational decisions for a vehicle. In one embodiment, the potential decisions are applied to autonomous driving. In one embodiment, a potential navigational decision comprises at least one of the following: a merge, an acceleration, a deceleration, and a turn. In one embodiment, the plurality of rules comprises at least in part a dangerous situation, for example a dangerous situation as defined in the responsibility sensitive safety (RSS) framework.

In one embodiment, the plurality of potential decisions include interpretations of a visual image. In one embodiment, the plurality of potential decisions include interpretations of fusing images of the same object or scene.

Simple Example.

Table 1 below gives a simple example of a root cause table using the disclosed techniques:

TABLE 1

Simple Example of Root Cause Table

| Root Cause Fault | Sub-Condition 1 (C1) person in front | Sub-Condition 2 (C2) person to my right | Sub-Condition 3 (C3) another car in front | Sub-Condition 4 (C4) another car to right | Sub-Condition 5 (C5) NV keeps going straight | Sub-Condition 6 (C6) NV turning to the right |
|---|---|---|---|---|---|---|
| dangerous situation with pedestrian | 1 | X | X | X | 1 | 0 |
| dangerous situation with pedestrian | 0 | 1 | X | X | X | 1 |
| dangerous situation with vehicle | X | X | 1 | X | 1 | 0 |
| dangerous situation with vehicle | X | X | X | 1 | 0 | 1 |

As shown in Table 1, if (C1 & C5 & C6'), meaning there is a person in front the NV, the NV keeps going straight, and the NV is not turning to the right, these subconditions match for root cause "dangerous situation with pedestrian". Similarly, if (C1' & C2 & C6), or there is not a person in front of the NV, there is a person to the right of the NV, and the NV is turning right, these subconditions also match for root cause "dangerous situation with pedestrian".

As shown in Table 1, if (C3 & C5 & C6'), meaning there is another car in front of the NV, the NV keeps going straight, and the NV is not turning to the right, these subconditions match for root cause "dangerous situation with vehicle". Similarly, if (C4 & C5' & C6), or there is a vehicle to the right of the NV, the NV is not going straight, and the NV is turning right, these subconditions also match for root cause "dangerous situation with vehicle."

Two rules in the CARBS associated with the simple RCT in Table 1 include:
Condition {if (PDS & input conditions) lead to dangerous situation with pedestrian}→Action {deprecate}; and
Condition {if (PDS & input conditions) leads to dangerous situation with vehicle→Action {deprecate}.

Although the foregoing embodiments have been described in some detail for purposes of clarity of understanding, the invention is not limited to the details provided.

There are many alternative ways of implementing the invention. The disclosed embodiments are illustrative and not restrictive.

What is claimed is:

1. A system, comprising:
   a processor; and
   a memory coupled with the processor, wherein the memory is configured to provide the processor with instructions which when executed cause the processor to:
   obtain a set of input conditions;
   obtain a plurality of potential decisions based at least in part on the set of input conditions;
   use a rule-based system to filter the plurality of potential decisions and obtain a set of one or more updated potential decisions, wherein the rule-based system is a commutative action rule-based system and wherein:
      the commutative action rule-based system specifies a plurality of rules;
      a rule specifies a rule condition and a corresponding action, wherein when the rule condition is met, the corresponding action is to be performed;
      each action of the rule-based system is commutative;
      using the commutative action rule-based system comprises: using an automatic root cause analysis module to find faults within the plurality of potential decisions; and restricting all corresponding actions for the plurality of rules to commutative actions; and
      the filtering of the plurality of potential decisions includes:
         for a selected potential decision in the plurality of potential decisions, determining whether the rule condition is met for a selected rule among the plurality of rules, wherein the selected rule condition is dependent on, at least in part, the selected potential decision; and
         in response to the selected rule condition being met, performing the corresponding action in any order with respects to another corresponding action associated with another selected rule condition;
         wherein the corresponding action is restricted to deletion of the selected potential decision from the plurality of potential decisions; and
   output the set of one or more updated potential decisions to be executed.

2. The system of claim 1, wherein to obtain the plurality of potential decisions comprises generating and/or receiving a potential decision.

3. The system of claim 1, wherein a potential decision determines a potential action to take relative to a current state.

4. The system of claim 3, wherein the potential action when carried out changes the current state and/or potential decision.

5. The system of claim 1, wherein to use the rule-based system to process the plurality of potential decisions comprises using the rule-based system to filter the plurality of potential decisions.

6. The system of claim 1, wherein the rule-based system allows the processing of the plurality of potential decisions to perform multiple corresponding actions on the selected potential decision.

7. The system of claim 6, wherein the multiple corresponding actions can be executed in different orders without affecting rule conditions for the plurality of rules.

8. The system of claim 1, wherein the selected rule condition is further dependent on, at least in part, the set of input conditions.

9. The system of claim 1, wherein the input conditions are determined based at least in part on telemetry.

10. The system of claim 1, wherein the rule-based system is configured to perform automatic root cause analysis, wherein a root cause fault corresponds to a fault relating to the potential decision and the root cause fault maps to a rule action.

11. The system of claim 1, wherein the rule actions include one or more of: deleting, reprioritizing, reevaluating, and/or modifying the one or more potential decisions that matches to at least one rule in the rule-based system.

12. The system of claim 1, wherein the plurality of potential decisions include potential navigational decisions for a vehicle.

13. The system of claim 12, wherein the potential navigational decision comprises at least one of the following: a merge, an acceleration, a deceleration, and a turn.

14. The system of claim 1, wherein the plurality of potential decisions include interpretations of a visual image.

15. The system of claim 1, wherein the plurality of potential decisions include interpretations of fusing images of the same object or scene.

16. The system of claim 1, wherein to perform rule actions comprises deleting one of the identified one or more potential decisions.

17. The system of claim 16, the processor is further configured to select a best updated decision from the set of one or more updated decisions based at least in part on a goodness metric.

18. The system of claim 17, wherein the potential decisions are applied to autonomous driving.

19. The system of claim 18, wherein the plurality of rules comprises at least in part a dangerous situation.

20. The system of claim 19, wherein the dangerous situation is defined in the responsibility sensitive safety (RSS) framework.

21. The system of claim 1, wherein determining whether the rule condition is met is based at least in part on a ternary match.

22. The system of claim 1, wherein performing rule actions is performed in parallel.

23. A method, comprising:
   obtaining a set of input conditions;
   obtaining a plurality of potential decisions based at least in part on the set of input conditions;
   using a rule-based system to filter the plurality of potential decisions and obtain a set of one or more updated potential decisions, wherein the rule-based system is a commutative action rule-based system and wherein:
      the commutative action rule-based system specifies a plurality of rules;
      a rule specifies a rule condition and a corresponding action, wherein when the rule condition is met, the corresponding action is to be performed;
      each action of the rule-based system is commutative;
      using the commutative action rule-based system comprises: using an automatic root cause analysis module to find faults within the plurality of potential decisions; and
   restricting all corresponding actions for the plurality of rules to commutative actions;
   and
      using the rule-based system to filter the plurality of potential decisions includes:

for a selected potential decision in the plurality of potential decisions, determining whether the rule condition is met for a selected rule among the plurality of rules, wherein the selected rule condition is dependent on, at least in part, the selected potential decision; and in response to the selected rule condition being met, performing the corresponding action in any order with respects to another corresponding action associated with another selected rule condition;

wherein the corresponding action is restricted to deletion of the selected potential decision from the plurality of potential decisions; and outputting the set of one or more updated potential decisions to be executed.

24. A computer program product, the computer program product being embodied in a non-transitory computer readable storage medium and comprising computer instructions for:

obtaining a set of input conditions;

obtaining a plurality of potential decisions based at least in part on the set of input conditions;

using a rule-based system to filter the plurality of potential decisions and obtain a set of one or more updated potential decisions, wherein the rule-based system is a commutative action rule-based system and wherein:

the commutative action rule-based system specifies a plurality of rules;

a rule specifies a rule condition and a corresponding action, wherein when the rule condition is met, the corresponding action is to be performed;

each action of the rule-based system is commutative;

using the commutative action rule-based system comprises: using an automatic root cause analysis module to find faults within the plurality of potential decisions; and restricting all corresponding actions for the plurality of rules to commutative actions;

and using the rule-based system to filter the plurality of potential decisions includes:

for a selected potential decision in the plurality of potential decisions, determining whether the rule condition is met for a selected rule among the plurality of rules, wherein the selected rule condition is dependent on, at least in part, the selected potential decision; and in response to the selected rule condition being met, performing the corresponding action in any order with respects to another corresponding action associated with another selected rule condition;

wherein the corresponding action is restricted to deletion of the selected potential decision from the plurality of potential decisions; and outputting the set of one or more updated potential decisions to be executed.

\* \* \* \* \*